Feb. 3, 1959 H. W. NEWSON 2,872,399
SELF-REACTIVATING NEUTRON SOURCE FOR A NEUTRONIC REACTOR
Filed July 7, 1953 10 Sheets-Sheet 1

INVENTOR.
BY HENRY W. NEWSON
ATTORNEY

INVENTOR.
BY HENRY W. NEWSON
ATTORNEY

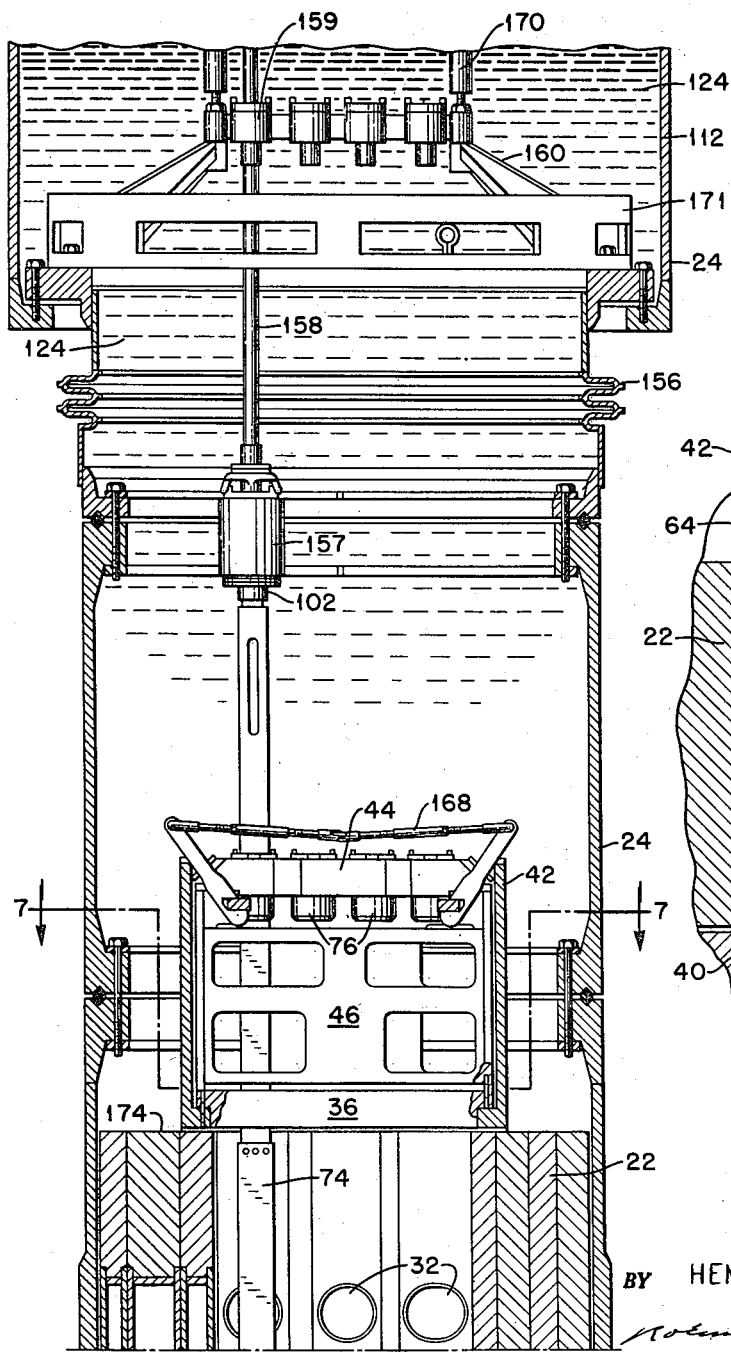
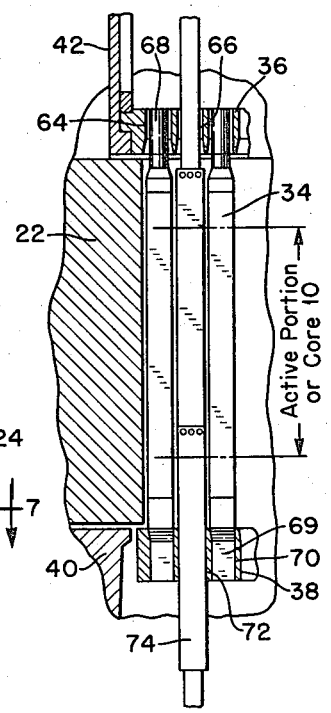

INVENTOR.
BY HENRY W. NEWSON
ATTORNEY

Feb. 3, 1959     H. W. NEWSON     2,872,399
SELF-REACTIVATING NEUTRON SOURCE FOR A NEUTRONIC REACTOR
Filed July 7, 1953     10 Sheets-Sheet 5

INVENTOR.
BY HENRY W. NEWSON
ATTORNEY

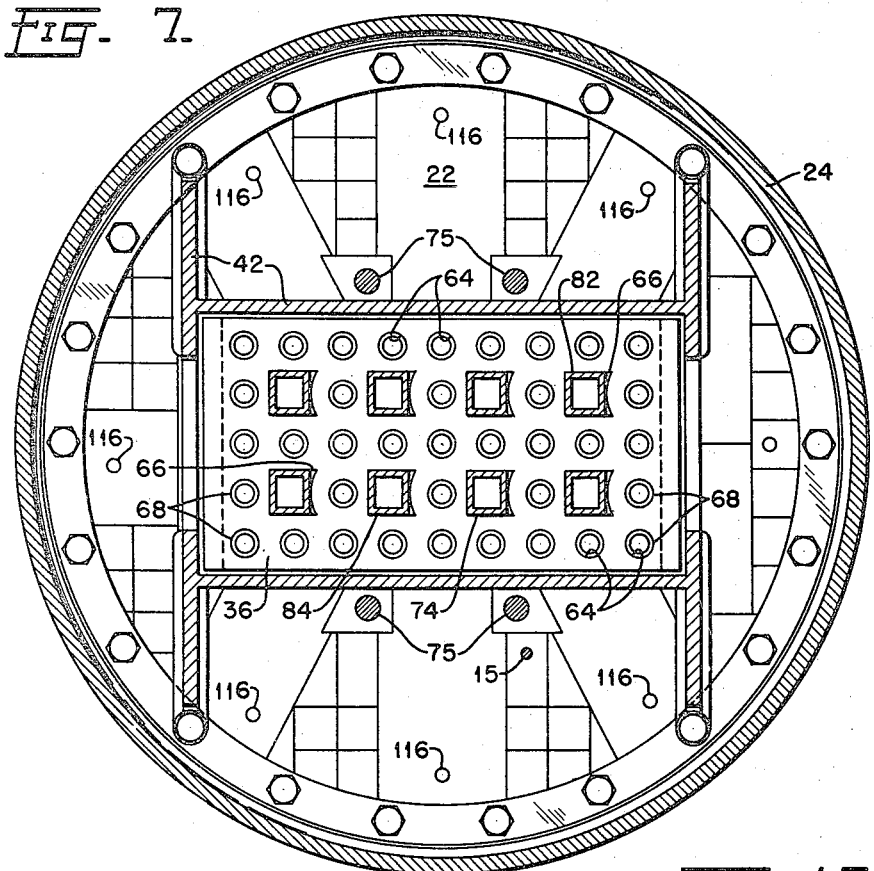
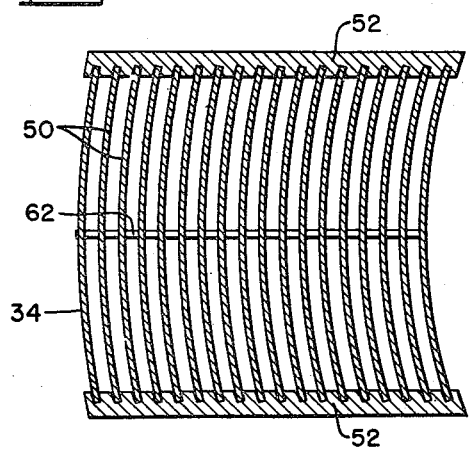
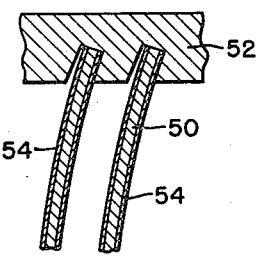
INVENTOR.
BY HENRY W. NEWSON
ATTORNEY

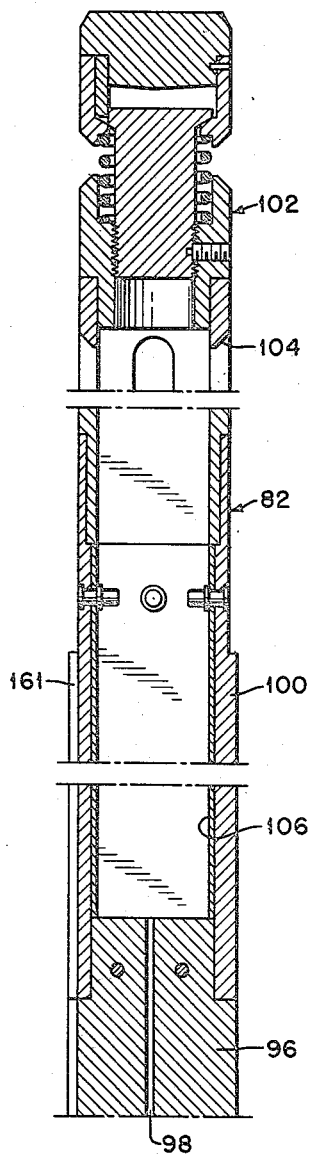
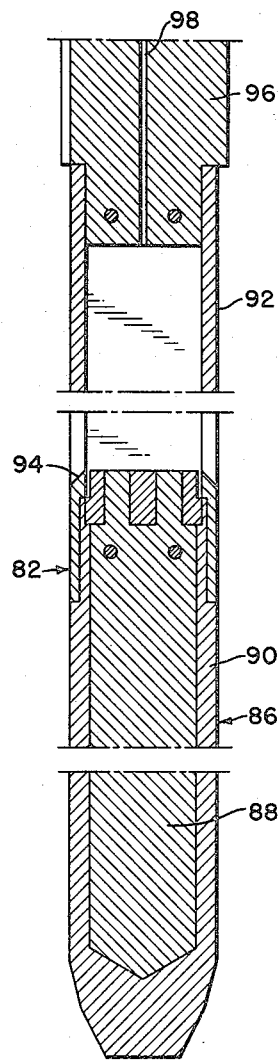

Feb. 3, 1959 H. W. NEWSON 2,872,399
SELF-REACTIVATING NEUTRON SOURCE FOR A NEUTRONIC REACTOR
Filed July 7, 1953 10 Sheets-Sheet 8

INVENTOR.
BY HENRY W. NEWSON
ATTORNEY

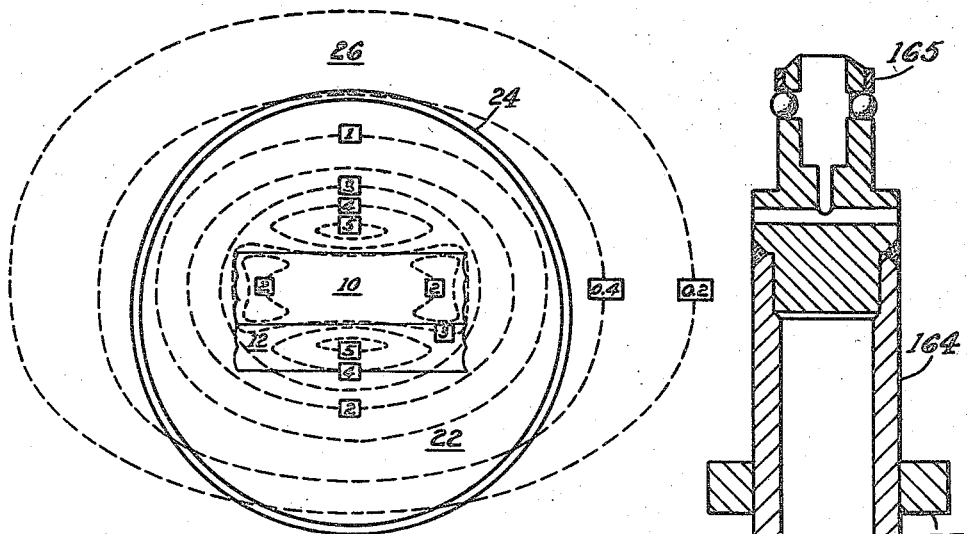
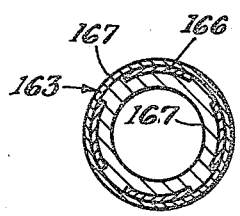
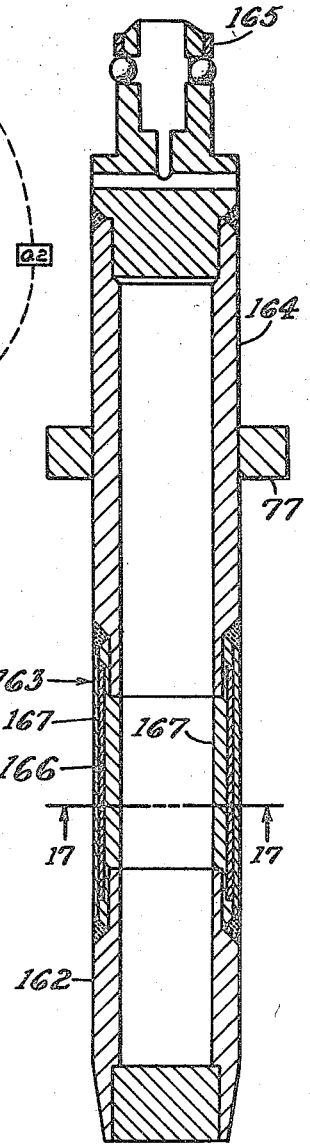
Feb. 3, 1959 H. W. NEWSON 2,872,399
SELF-REACTIVATING NEUTRON SOURCE FOR A NEUTRONIC REACTOR
Filed July 7, 1953
FIG. 18.
FIG. 17.
FIG. 16.
|   | a | b | c | d | e | f | g | h | i |   |
|---|---|---|---|---|---|---|---|---|---|---|
| A | 150 | 150 | 150 | 150 | 150 | 150 | 150 | 150 | 150 | Preliminary Reflector 12 |
| B | 150 | 82 | 150 | 82 | 150 | 82 | 150 | 82 | 150 | |
| C | 34 | 34 | 34 | 34 | 34 | 34 | 34 | 34 | 34 | Active Portion or Core 10 |
| D | 34 | 84 | 34 | 84 | 34 | 84 | 34 | 84 | 34 | |
| E | 34 | 34 | 34 | 34 | 34 | 34 | 34 | 34 | 34 | |
FIG. 15.
INVENTOR
HENRY W. NEWSON
BY
Roland A. Anderson
Attorney

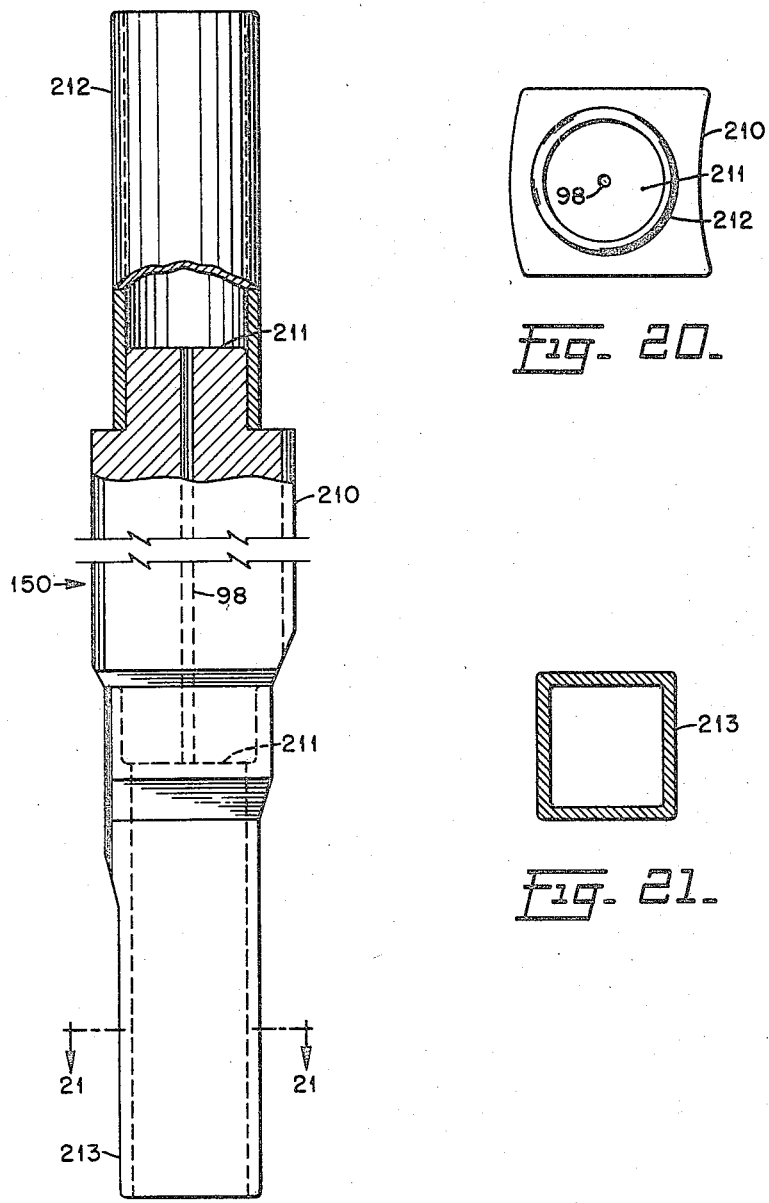

United States Patent Office 2,872,399
Patented Feb. 3, 1959

2,872,399
SELF-REACTIVATING NEUTRON SOURCE FOR A NEUTRONIC REACTOR

Henry W. Newson, Durham, N. C., assignor to the United States of America as represented by the United States Atomic Energy Commission Application July 7, 1953, Serial No. 366,615

1 Claim. (Cl. 204—193.2)

The present invention relates generally to the neutronic reactor art, and it is particularly concerned with a novel neutron source for use in the start-up of high flux beryllium containing reactors, such as the reactors described in U. S. Patents 2,831,806, issued April 22, 1958, and 2,832,732, issued April 29, 1958, both assigned to this assignee, inventor Eugene P. Wigner.

As used in this specification and in the appended claim, the following terminology is defined as indicated below:

Thermal neutrons—Neutrons having a substantially Maxwellian number-energy distribution characteristic about an energy value equal to CT, where C is a constant and T is the temperature in degrees Kelvin. (CT=0.025 electron volts at 15° C.)

Slow neutrons—Neutrons having a kinetic energy less than one electron volt.

Fast neutrons—Neutrons having a kinetic energy greater than 100,000 electron volts.

Intermediate neutrons—Neutrons having a kinetic energy in the range between that of fast neutrons and that of slow neutrons.

Reactor active portion (core)—That inner portion of a neutronic reactor which contains fissionable material and is characterized by a multiplication constant ($k$) greater than unity. The symbol ($k \infty$) is sometimes employed in the literature to represent the multiplication constant ($k$).

Fission—The splitting of an atomic nucleus, upon the absorption of a neutron, into a plurality of fragments of greater mass than that of an alpha particle, the splitting being accompanied by the release of energy and a plurality of neutrons.

Fissionable—Having the property of undergoing fission upon the absorption of a slow neutron.

Fertile—Having the property of converting to fissionable material upon the absorption of a slow neutron.

Moderator material—A non-gaseous material for which the ratio $$\frac{\xi \sigma_s}{\sigma_a}$$

is greater than 10, wherein $\xi$ is the average loss in the logarithm of the energy of a fast neutron per elastic collision with the material, $\sigma_s$ is the thermal neutron elastic scattering cross section per atom of the material, and $\sigma_a$ is the thermal neutron absorption cross section per atom of the material.

Slow neutron absorber—A non-fissionable atomic nucleus having a thermal neutron absorption cross section greater than one hundred barns.

Diluent material—Any non-fissionable material present in the active portion of a neutronic reactor.

Dilution—The ratio of diluent atoms to fissionable atoms in the active portion of a neutronic reactor.

Specific activity—The number of disintegrations per second per unit volume of radioactive material.

Specific power—Kilowatts heat output of a neutronic reactor per kilogram of fissionable material present in the active portion.

As is now well known, by massing together sufficient fissionable material under appropriate conditions, a self-sustaining neutron reactive assemblage may be formed, which assemblage, by reason of its ability to generate neutrons at an equal or greater rate than they are being lost thereto by absorption or leakage, is capable of maintaining a self-sustained chain reaction of neutron induced fission. Apparatus which employs such a neutron reactive assemblage has been termed a neutronic reactor, nuclear reactor, or "pile." A description of the first such reactor to be constructed in the United States is given in Experimental Production of a Divergent Chain Reaction, E. Fermi, Am. Jour. of Physics, vol. 20, No. 9, December 1952. Detailed descriptions of the theory and practice of the design, construction, and operation of neutronic reactors generally are set forth in the Science and Engineering of Nuclear Power, C. Goodman, Addison Wesley Press, Inc., Cambridge, Massachusetts, vol. 1 (1947) and vol. 2 (1949); in The Elements of Nuclear Reactor Theory, S. Glasstone and M. Edlund, D. Van Nostrand Company, Inc., New York, 1952; in Elementary Pile Theory, H. Soodak and E. C. Campbell, John Wiley and Sons, New York, 1950; and in U. S. Patent 2,708,656, issued May 17, 1955, and assigned to this assignee, inventors E. Fermi and L. Szilard. Reference is made particularly to chapters 4, 5, 6, 8 and 9 of Goodman, vol. 1. Any terminology not specifically defined herein is used in the sense defined on pages 112 to 115 of Goodman, vol. 1.

One of the important uses of neutronic reactors is to irradiate materials with neutrons and other nuclear particles and radiations. In this manner, radioactive isotopes may be produced for all chemical elements with the exception of helium. The physical transformation of elements as a result of irradiation in a neutronic reactor may be accomplished through any one of a number of reactions which are fully described in the published literature. Radioactive isotopes produced by neutronic reactors are receiving large commercial interest, particularly such isotopes as $H^3$, $C^{14}$, $P^{32}$, $S^{35}$, and $I^{131}$. As a result, there is a great demand for neutronic reactors which are particularly adapted to produce radioactive isotopes.

For various reasons, as fully presented in the aforementioned patents of Eugene P. Wigner, it is particularly desirable that a reactor intended to be used for the neutron irradiation of materials be capable of operation at extremely high values of slow neutron flux. The above-mentioned patents of Wigner disclose slow, or thermal, reactors especially adapted for neutron irradiation, utilizing beryllium in the reflector region thereof, and operating at a design power level of about 30,000 kw., a peak slow neutron flux of about $5 \times 10^{14}$ neutron/cm.$^2$/sec., and an average slow neutron flux throughout the active portion of about $2 \times 10^{14}$ neutrons/cm.$^2$/sec.

In the operation of these reactors the neutron flux level is raised to the design level by the operator effecting the withdrawal of various control elements containing neutron absorber, and it is, of course, absolutely necessary that during any such period of control element withdrawal, the operator have available reliable and accurate information as to the instantaneous value of slow neutron flux so that he can determine the effect of his control element manipulations. Various well known types of slow neutron flux measuring and indicating devices are conventionally used for this purposes.

However, no slow neutron flux measuring devices, or combinations thereof, are available which are capable of reliable and accurate operation over the extremely large range of slow neutron flux which would be involved in changing the flux level of the above-referred to reactors from zero to the design level of $2 \times 10^{14}$ neutrons/cm.$^2$/sec. Thus, in these reactors, no accurate and reliable information as to the neutron flux level is available to the reactor operator when the flux level is below about $10^{-11}$ of design power level, that is, below about 2000 neutrons/cm.$^2$/sec. This, therefore, constitutes a blind region, in which the operator would not be permitted to withdraw any control elements at all, lest the reactor become supercritical on a very short period without his knowledge. The slow neutron flux level must, therefore, be raised or maintained above this blind region by means of some extraneous source of neutrons. In the past, some independent and self-sufficient type of neutron source, such as the conventional radium-beryllium or polonium-beryllium sources, were used for this purpose, the source being bodily inserted into the reactor during start-up operations and bodily removed therefrom after the reactor became self-sustaining at a neutron flux level which was high enough to be reliably and accurately measured. This past practice, of course, was disadvantageous not only in requiring a fairly expensive neutron source but, more importantly, in requiring provision for insertion and removal of the source into and out of the reactor, and in requiring an absolutely foolproof interlock system to prevent the possibility of the control elements being withdrawn unless the source was in its proper place in the reactor.

In accordance with the principles of the present invention, advantage is taken of the photoneutron sensitive properties of the beryllium present in the reflector region of the above referred to reactors to provide a permanent, foolproof, neutron source, integral with the reactor, which is automatically and indefinitely reactivated by the operation of the reactor, itself. For this purpose, a quantity of antimony is permanently incorporated in, and as an integral part of, the reactor in, or near, the beryllium reflector region. During operation of the reactor the natural occurring antimony isotope of atomic weight 123 absorbs neutrons and is thereby transformed to the antimony isotope of atomic weight 124 which is radioactive and emits gamma rays with a 60 day half-life. The gamma rays so emitted have an energy of 1.72 m. e. v. which is above the threshold energy associated with the photosensitive characteristic of beryllium so that the gamma rays react with the beryllium to produce neutrons. The beryllium and antimony thus cooperate to produce a built-in neutron source which is automatically reactivated by the operation of the reactor, itself, and which is of sufficient strength to maintain the slow neutron flux at a sufficiently high level to be reliably measured during periods when the reactor is shut down.

Accordingly, it is the object of the present invention to provide a reactor with a built-in automatically reactivating neutron source.

Another object of the invention is to provide a cheap, convenient, permanent, integral, and automatically reactivating neutron source for use in association with a neutronic reactor of a type applying beryllium as the neutron reflector or neutron moderator thereof.

Other properties and advantages of neutronic reactors and sources therefor, constructed according to the teachings of the present invention, will become readily apparent from a study of the following description of the invention, together with the illustrative embodiment shown in the drawings, in which:

Figure 3 is a vertical central sectional view of the upper portion of the reactor tank shown generally in Figures 1 and 2, this view being taken looking from left to right in Figure 2;

Figure 5 is a fragmentary sectional view of a detail of Figures 3 and 4;

Figure 7 is a horizontal sectional view taken along line 7—7 of Figure 3;

Figure 9 is an expanded transverse sectional view of the fuel assembly taken along line 9—9 of Figure 8;

Figure 10 is a fragmentary expanded sectional view of a detail of the fuel assembly shown in Figure 9;

Figure 11 is a vertical central sectional view of the upper portion of one type of composite control element shown generally in Figures 3 and 4;

Figure 12 is a vertical central sectional view of the remaining portion of the composite control element shown in Figure 11;

Figure 15 is a schematic horizontal sectional diagram of the mid-plane of the core and preliminary reflector of the reactor illustrating the loading pattern employed in the specifically exemplified reactor;

Figure 16 is a vertical central sectional view of the regulating rod;

Figure 17 is a transverse sectional view of the regulating rod taken along line 17—17 of Figure 16;

Figure 18 is a schematic sectional view taken along the horizontal mid-plane of the reactor and showing the unusual slow neutron flux distribution provided by the present invention;

Figure 19 is an elevation view, partly in section, of the reflector assembly schematically indicated in Figure 15;

Figure 20 is a plan view of the reflector assembly shown in Figure 19; and

Figure 21 is a transverse sectional view taken along line 21—21 of Figure 19.

Figure 1:
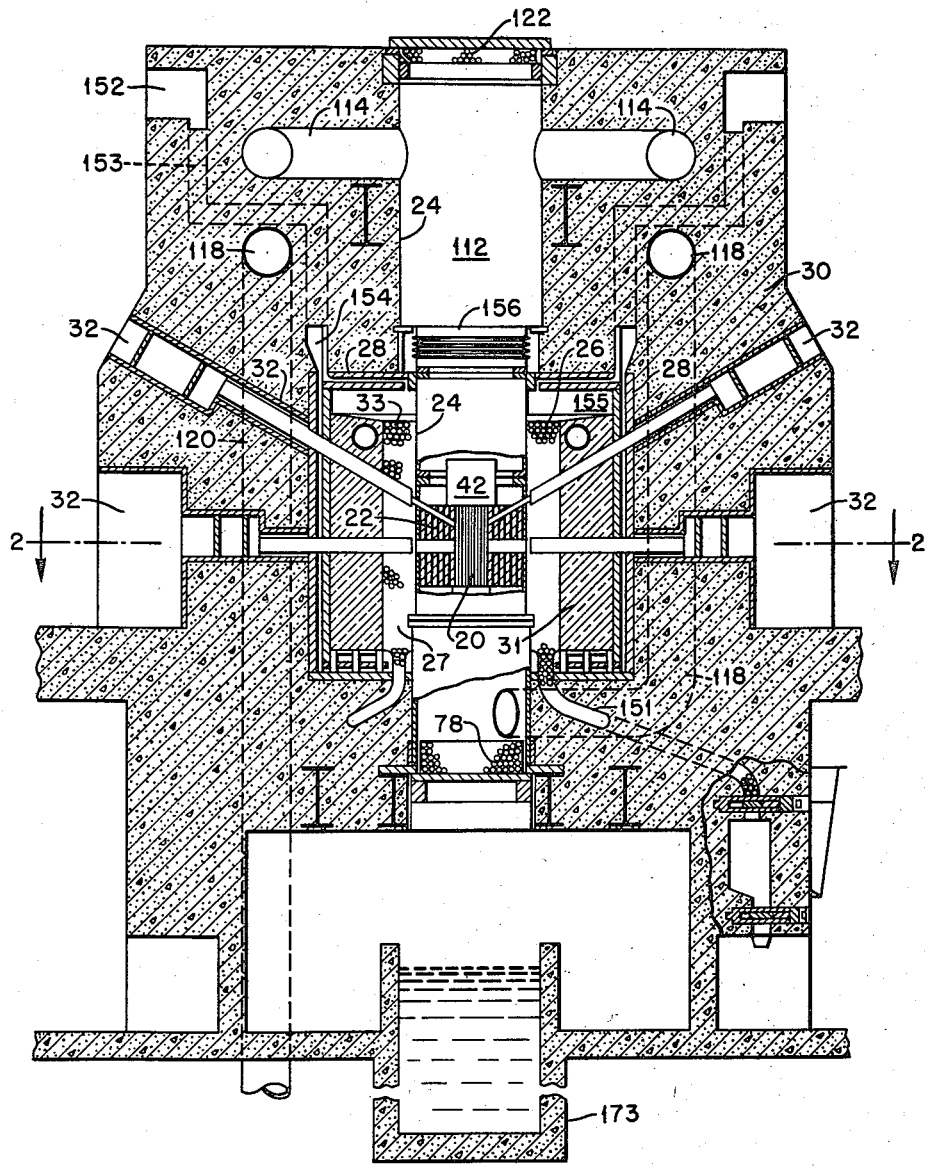
Figure 1 is a vertical central sectional view of a neutronic reactor having incorporated therein the novel neutron source of the present invention.
Figure 2:
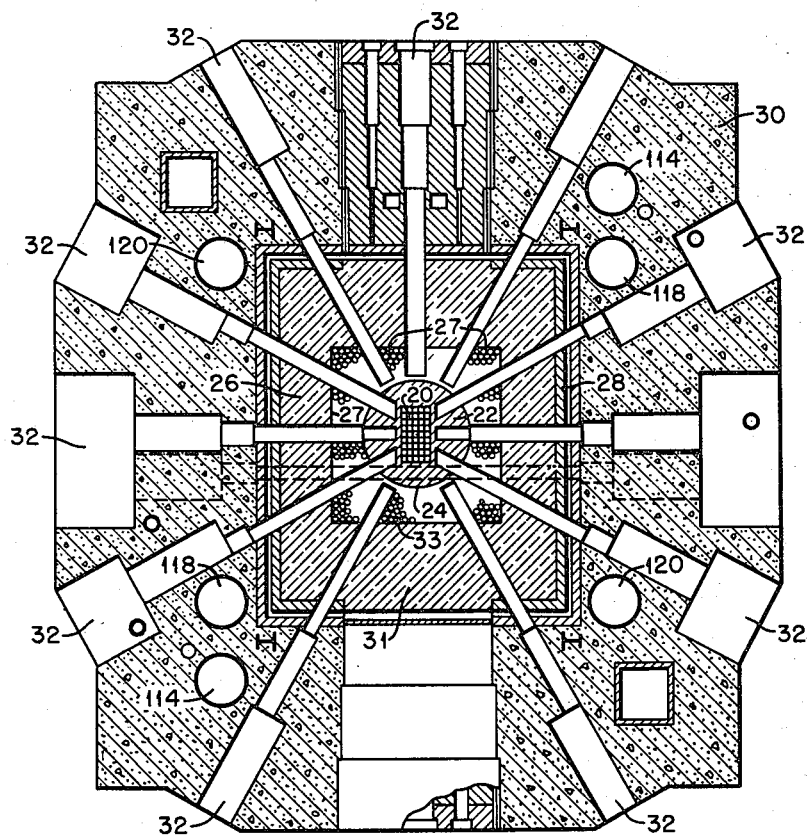
Figure 2 is a horizontal sectional view taken along line 2—2 of Figure 1.

As shown in Figures 1 and 2, the reactor has a rectangular central channel 20, which will be understood to contain the active portion or core 10 and the preliminary reflector 12, shown in Figure 15. The central channel 20 is surrounded by a first reflector 22 formed of moderator material, both the reflector 22 and the central channel 20 being disposed within a tank 24. As will hereinafter be described in detail, ordinary water circulates downwardly through tank 24 and occupies all space within the tank not otherwise occupied, the water serving as both moderator and coolant for the reactor. A second reflector 26 also formed of moderator material is disposed about the outer periphery of the tank 24, and a thermal shield 28 surrounds the second reflector 26. A massive biological radiation shield 30 surrounds the thermal shield 28. Figures 1 and 2 also show a number of radiation passages 32 extending through the biological shield 30, the thermal shield 28, the second reflector 26, and the first reflector 22 to the central channel 20 of the reactor. These passages are provided to enable operating personnel to position materials which are to be irradiated at a desired position relative to the core of the reactor, and they may be plugged with shielding material when not in use.

In the particular construction of the neutronic reactor which will be used as a specific example throughout this application, the first reflector 22 is constructed of elongated rectangular beryllium blocks, and it forms a cylinder approximately 54 inches in outside diameter and 40 inches high. The rectangular central channel 20 formed in the first reflector is approximately 16 inches wide by 28 inches long. The active portion or core 10 is centrally located vertically with respect to the central channel 20 and has a height of 23¾ inches. The active portion 10 is substantially coextensive in length with the central channel 20 but occupies only the first three-fifths of the width thereof (from left in Fig. 1). The remaining two-fifths of the width of the central channel 20 is occupied by a preliminary reflector 12 of beryllium which is substantially coextensive in height with the first reflector 22. As can be seen in Figure 15, and as will hereinafter be more fully described, the preliminary reflector 12 is made up of beryllium reflector assemblies 150, shown in detail in Figures 19, 20 and 21, and the beryllium moderating elements 96 of reflecting control elements 82, shown in detail in Figures 11 and 12. The preliminary reflector 12 and the first reflector 22 are provided with a multitude of vertically extending 3/16 inch diameter coolant holes 98 (Figures 6, 11, 12, 19, 20 and 21) and 116 (Figure 6), respectively, the number and spacing of these holes being such that the volume percentage of water in the preliminary reflector 12 is about 8%, and in the first reflector 22 about 4%. The tank 24 is one inch thick, is formed of aluminum, and extends some 19 feet above the active portion 10 and some 8 feet below the active portion 10. The second reflector 26 is formed of graphite, has a height of about 9 feet, and is centered in a vertical direction with respect to the active portion 10. In cross-section, it forms a rectangle about 12 feet by 14 feet. This graphite reflector is divided into a region 27 nearest to the active portion 10 consisting of about 700,000 graphite balls 33, one inch in diameter, and a region 31 of substantially solid graphite.

Region 27 has a square cross section about 7 feet, 4 inches on a side. It will be appreciated that since region 27 is in a relatively high flux portion of the reactor, considerable distortion in this region would normally be anticipated due to the Wigner effect. By utilizing graphite balls in this region any expansion due to radiation effects or temperature increase is readily accommodated by a corresponding slight variation in the level of the balls. Furthermore, should the balls become badly deteriorated from the Wigner effect, they are readily removable by gravity via chutes 151 and replaceable from the top of the reactor. The region 31 of substantially solid graphite has a multitude of one-half inch diameter coolant holes (not shown) drilled vertically therethrough, the spacing of the holes increasing outwardly such that the volume occupied thereby varies from about four percent at the inner edge of region 31 to zero (no holes) in the outer half of the region 31. The thermal shield 28 comprises two spaced 4 inch thick layers of steel, the purpose of this shield being to absorb most of the residual radiation and thus protect the inner portion of the biological shield 30 from overheating. The biological shield 30 is about 9 feet thick and is formed of a barytes concrete in which the gravel part of the mix is approximately 93% $BaSO_4$. The entire reactor including shield 30, thus forms an approximate cube about 34 feet to a side.

As previously indicated, the neutronic reactor is both cooled and moderated by the same flow of water. The tank 24 is provided with an enlarged reservoir portion 112 near the top thereof. Coolant inlet pipes 114 are connected to the reservoir portion 112 of the tank 24 and introduce the water coolant into the reservoir portion 112 of the tank 24. The water coolant then flows downwardly through the coolant channels in the active portion 10, as will later be described, and also through the holes 98 and 116 in the preliminary reflector 12 and the first reflector 22. Return pipes 118 adjacent to the bottom of the tank 24 return the coolant upwardly through the shield 30. The water is then recirculated downwardly through another portion of the shield 30 through coolant exit pipes 120 disposed in the shield 30. In this manner, all portions of the reactor located within tank 24 are cooled. The exit water is cooled and demineralized by conventional equipment, not shown, located externally of the shields and is returned to the reactor via inlet pipes 114.

Tank 24 is provided with a removable bellows type expansion joint section 156 interconnecting its enlarged reservoir portion 112 and its lower smaller portion, this joint section having a plurality of convolutions of thin stainless steel. This expansion joint section permits free thermal expansion and contraction of the tank 24 without setting up excessive stresses in the structure. Removal of this section 156 provides access to the graphite ball containing region 27 for filling same when it is desired to replace the graphite balls.

The water in tank 24 directly above and below the active portion forms a pool 124 which also serves as radiation shielding. The tank 24 is provided with a top plug 122 and a bottom plug 78. Each of these plugs comprise a hollow stainless steel cylindrical shell filled with lead shot for shielding purposes. The thickness of the top plug is about one foot and that of the bottom plug is about three feet. The top plug is removable by an overhead crane, not shown, whereupon access may be had to the reactor components located within tank 24.

A secondary air coolant system is provided for cooling portions of the reactor located outside of the tank 24. The cool air enters near the top of the reactor at 152 and travels downwardly and inwardly through the shield 30 via ducting 153 to annular manifold 154. It then flows in two parallel paths to the annular air space 155 which is left between the top thermal shield 28 and the top of the second reflector 26. The first path is by way of the horizontal space between the two layers forming the top thermal shield 28. The second path is first downwardly through the vertical space between the two layers forming the side thermal 28, and then upwardly through the interstices between the graphite balls of region 27 of the second reflector 26 and through the multitude of small holes drilled for this purpose through the solid graphite region 31 of the second reflector 26. The air is then removed from space 155 by way of ducts, not seen in Fig. 1, which pass downwardly and outwardly through the shield 30.

Figure 4:
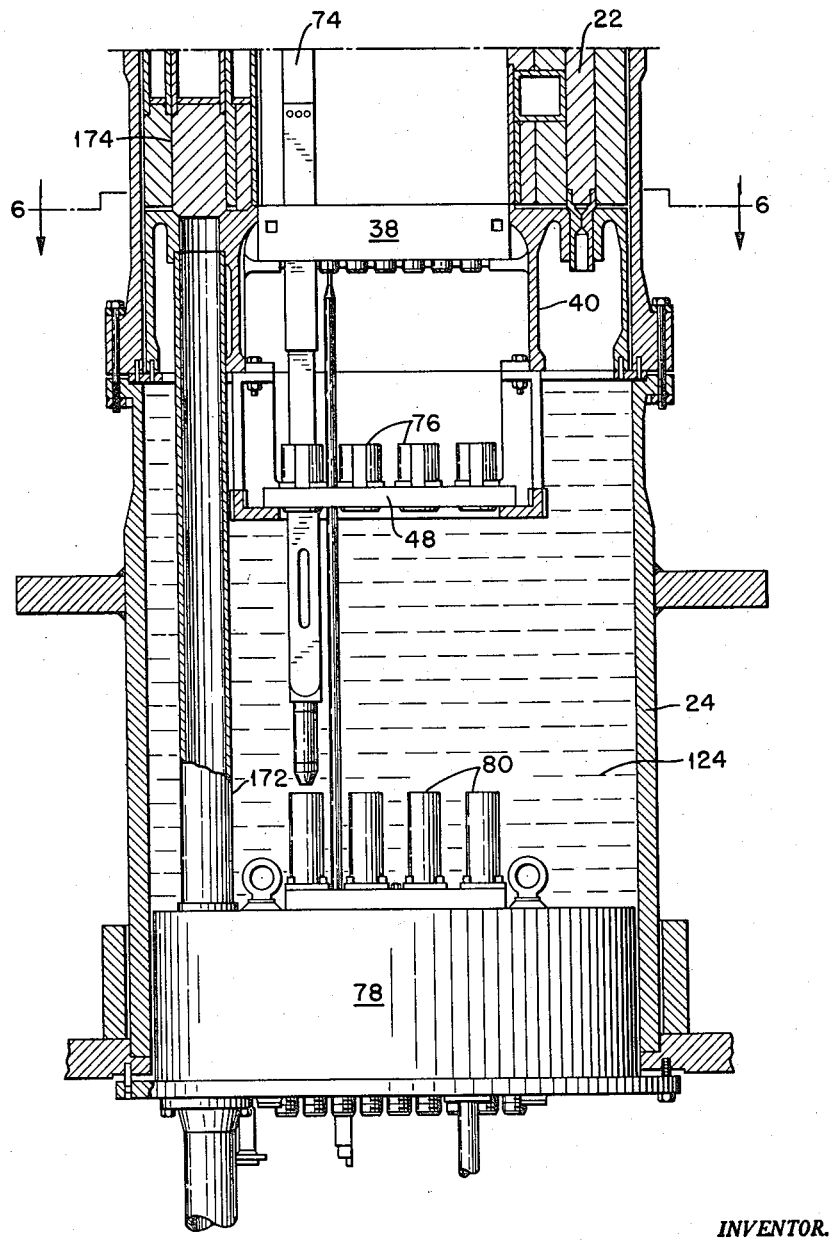
Figure 4 is a vertical central sectional view of the remaining portion of the reactor tank shown in Figure 3.

The active portion 10 of the reactor is formed by means of a plurality of fuel assemblies 34 (Figures 8 through 10) immersed in the water moderator. The fuel assemblies 34 are supported between an upper assembly grid 36 and a lower assembly grid 38, a shown in Figures 3 through 5. A lower support member 40 is secured to the tank 24, and secures the lower assembly grid 38. The upper assembly grid 36 is also secured to the tank 24 by an upper support member 42. An upper guide grid 44 rests upon the upper assembly grid 36 by means of a grid spacer 46. A lower guide grid 48 is positioned beneath the lower assembly grid 38 and is attached to the tank 24 by the support member 40. The upper guide grid 44, grid spacer 46, and upper assembly grid 36 together form a unit which may be locked in place in the upper support member 42 by locking mechanism 168 or may be removed as a unit from the upper support member 42.

Figure 8:
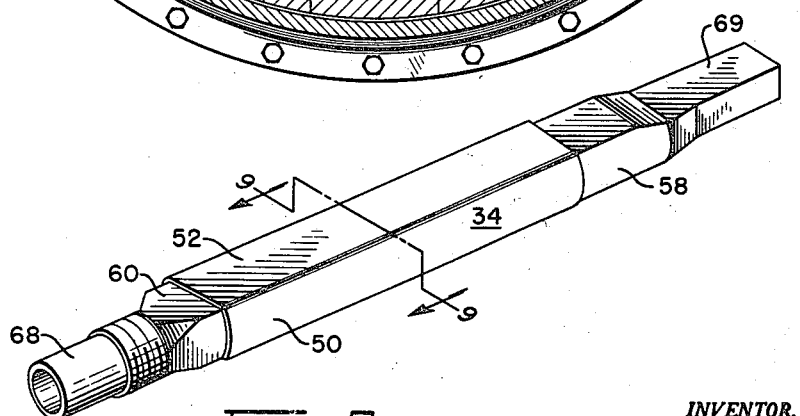
Figure 8 is an isometric view of one of the fuel assemblies of the neutronic reactor.

The fuel assemblies 34 are specifically illustrated in Figures 8 through 10. Fuel plates 50, containing fissionable material as a centrally positioned inner layer there-of, are provided with a corrosion resistant cladding 54 and are secured to side plates 52. The fuel plates 50 are curved or bowed somewhat for reasons hereinafter to be discussed. A pair of comb-shaped supports 62 at the ends of the plates 50 aid in maintaining the plates in rigid spaced relationship. The fuel assemblies 34 terminate in hollow aluminum end boxes 58 and 60 which permit the fuel assemblies to be secured between the upper and lower assembly grids 36 and 38.

In the particular construction of the neutronic reactor used as an example throughout this description, the inner layer of plates 50 is formed of uranium alloyed with aluminum, the alloy containing 14% uranium by weight. The uranium employed in the alloy is enriched in its fissionable $U^{235}$ isotope to such a degree that 93.5% of the uranium atoms are $U^{235}$ atoms. All other portions of the fuel assembly are formed of aluminum. Each fuel assembly 34 contains eighteen plates 50, each plate being 2.85 inches wide, before curving. The sixteen inner plates 50 are 24⅝ inches long and the two outer plates are 28⅝ inches long. Each of the plates 50 is 0.06 inch thick, including the cladding 54, and the spacing between the surfaces of adjacent plates is 0.118 inch. The radius of curvature of plates 50 is 5.5 inches. The inner layer of uranium-alloy in all of plates 50 is 2.55 inches wide, before curving, 23¾ inches long, and 0.021 inch thick. Each of the plates 50 contains 7.7 grams of $U^{235}$, the entire fuel assemblies 34 each containing approximately 140 grams of $U^{235}$. The side plates 52 and comb-shaped supports 62 are in contact only with the fissionable free border of plates 50 so that nothing except the coolant water contacts the plate surfaces at any point overlying the 2.55 inches by 23¾ inches fissionable layer. The side plates are 0.118 inch thick, and have the same length, 28⅝ inches, as the two outer fuel plates. The end boxes 58 and 60 are attached to the ends of the two outer fuel plates 50 and to the ends of said plates 52.

Figure 6:
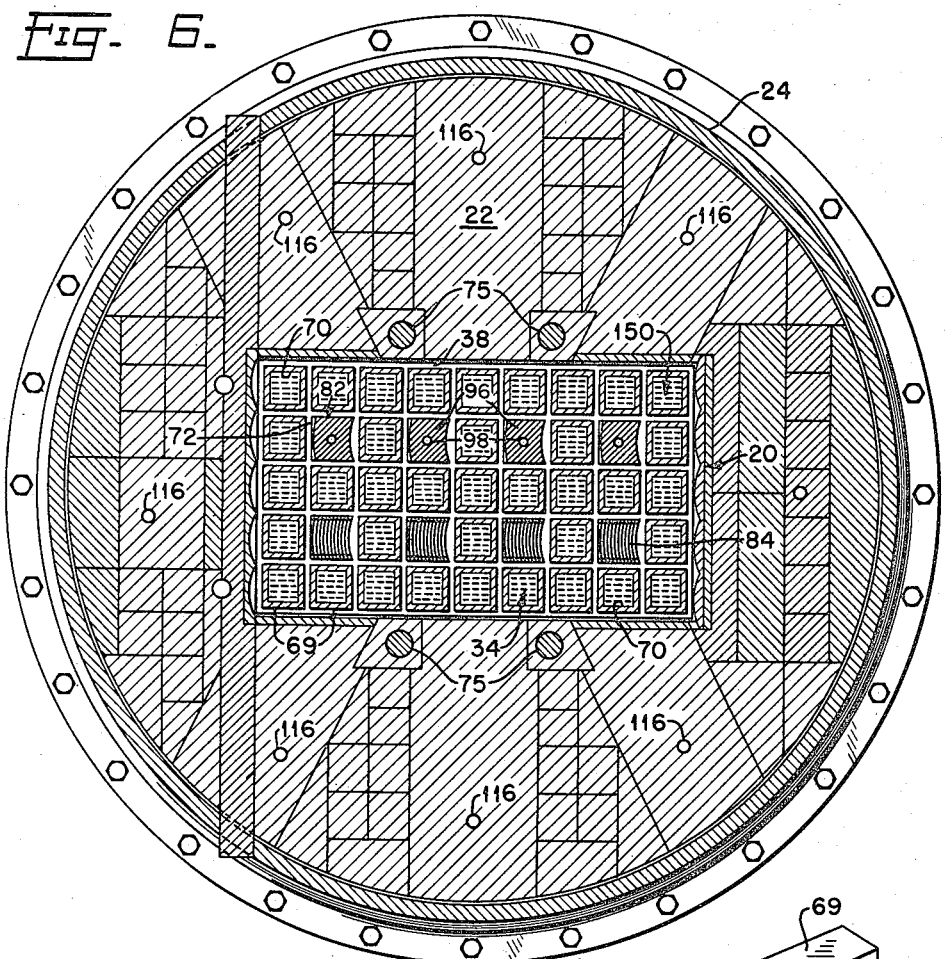
Figure 6 is a horizontal sectional view taken along line 6—6 of Figure 4.

Figure 7 indicates that the upper assembly grid 36 is provided with rows of circular apertures 64, some of the circular apertures 64 being separated by eight apertures 66 which are essentially rectangular but have a curved side which conforms to the bowed shape of one side of the central section 161 of control elements 82 and 84 hereinafter to be described. The upper end boxes 60 of the fuel assemblies 34 are provided with circular connectors 68 which are adapted to fit into the circular apertures 64 of the upper assembly grid 36. The lower assembly grid 38, illustrated in Figure 6, is provided with rows of rectangular orifices 70, aligned with the circular apertures 64 of the upper assembly grid, some of the orifices 70 being separated by eight orifices 72, which have the same shape as the eight apertures 66 in the upper assembly grid 36 and are aligned therewith. The lower end boxes 58 of the fuel assemblies 34 have rectangular connectors 69 which are adapted to snugly fit the rectangular orifices 70 of the lower assembly grid 38, thus permitting fuel assemblies 34 to be secured between the upper and lower assembly grids 36 and 38.

As indicated in Figure 15, the preliminary reflector 12 of the reactor comprises a plurality of reflector assemblies 150 having an outer shape and dimensions similar to the fuel assemblies 34. As indicated in Figures 19, 20, and 21, wherein one such reflector assembly 150 is shown in detail, the principal component of the reflector assembly is a 37⅛ inches long beryllium block 210 which is solid except for the aforementioned ⅜ inch diameter central coolant hole 98. The middle 34⅝ inches of the block has outer dimensions and shape substantially identical with the main central section of the fuel assemblies 34 and the remaining 1¼ inch sections 211 at each end have a reduced circular cross section 2.00 inches in diameter. Upper and lower hollow aluminum end connectors, 212 and 213, respectively, corresponding to the fuel assembly end connectors 68 and 69, respectively, shown in Fig. 8, are attached to the reduced circular end sections 211 of the beryllium block so that the entire reflector assembly 150 may be secured, in the same manner as the fuel assemblies 34, between the upper and lower assembly grids 36 and 38, respectively. Thus the circular upper end connectors 212 are adapted to snugly fit the circular apertures 64 of the upper assembly grid 36, and the rectangular lower end connectors 213 are adapted to snugly fit the rectangular orifices 70 of the lower assembly grid 38. When so secured the beryllium of the reflector assemblies 150 is centrally positioned with respect to the horizontal mid-plane of the active portion 10.

The apertures 66 in the upper assembly grid 36 and the orifices 72 in the lower assembly grid 38 are provided for eight composite control elements 74 which are slidably disposed within the central channel 20 of the reactor. The control elements 74 are journalled within bearings 76 in the upper and lower guide grids 44 and 48, these bearings being square in cross section. The bottom plug 78 at the lower end of the tank 24 supports eight shock absorbers 80 aligned with the bearings 76 in the upper and lower guide grids 44 and 48 for the purpose of absorbing a portion of the shock caused by the falling control elements 74 should the control elements 74 be rapidly released to shut down the reactor in case of emergency.

The control elements 74 terminate at their upper end in an armature head 102 adapted to be accommodated and releasably held by an electromagnet in the form of a socket 157 (see Figure 3) which fits over the armature head. The socket is supported by a vertical lifting shaft 158 which extends up through a guide 159 in a spider 160, and thence through the top plug 122 of the tank 24. The spider 160 is suspendable from top plug 122 via support tubes 170, but it is properly aligned and receives its actual support when in place in the reactor from a ring support 171. The lifting shafts 158 and their attached control elements 74 are individually positionable in the vertical direction by suitable power motors (not shown) located on top of plug 122. In case of an emergency requiring the reactor to be shut down as quickly as possible, the currents to all electromagnet sockets 157 are interrupted, whereupon the control elements 74 detach and drop into shock absorbers 80.

There are two types of composite control elements 74 slidably disposed within the central section 20 and used for shim, or coarse, control of the reactor. The one type, illustrated at 82, has one vertically extending portion formed essentially of moderator material, and vertically adjacent thereto, another vertically extending portion containing a slow neutron absorber, either of these portions being disposable, by appropriate vertical positioning of the control element, alongside of the fuel containing portion of the adjacent fuel assembly 34. The second type of control element 84 has one vertically extending portion containing fissionable material, and vertically adjacent thereto, another vertically extending portion containing a slow neutron absorber, either of these portions being disposable, by appropriate vertical positioning of the control element, alongside of the fuel containing portion of the adjacent fuel assemblies. In the case of both types of control rods 82 and 84, the portion containing the slow neutron absorber is the upper portion.

The first type of control element 82, which may be referred to as a reflecting control element, is specifically illustrated in Figures 11 and 12. There are four of these control elements 82 and they are arranged to slide in those four apertures 66 of the upper assembly grid 36 which lie in the second row of apertures from the top (looking at Figure 7). Each of control elements 82 is provided with a tapered bottom tip 86 which is constructed of materials which will tend to absorb the shock caused by rapid dropping of the control element 82 into shock absorber 80. A plug 88 of shock resistant material sheathed in a jacket 90 of durable material provides a tip 86 which will withstand considerable shock. A sleeve 92 is provided with a water outlet aperture 94, and is attached to an element 96 which is formed of a material having neutron moderating properties approximately the same as those of the first reflector 22. A coolant hole 98 extends centrally through the moderating element 96. A second sleeve 100 is attached to the opposite end of the element 96 and connects the element 96 with the armature head 102 of the control element 82. A water inlet aperture 104 is disposed in the sleeve 100, so that water may enter into the sleeve 100, flow through the coolant hole 98, through the sleeve 92 and out of the aperture 94, thus cooling the control element 82. A slow neutron absorbing liner 106 is also disposed within the sleeve 100. The liner 106 should be constructed of a material having a thermal neutron absorption cross section of at least 100 barns, such as cadmium.

Figure 13:
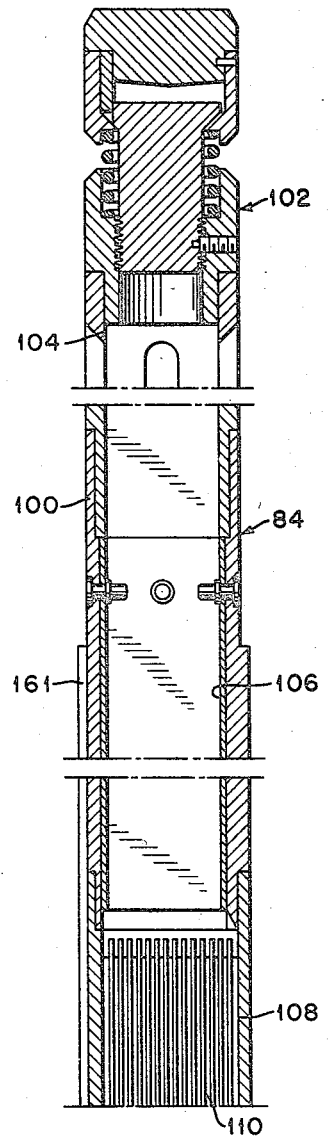
Figure 13 is a vertical central sectional view of the upper portion of a second type of composite control element shown generally in Figures 3 and 4.
Figure 14:
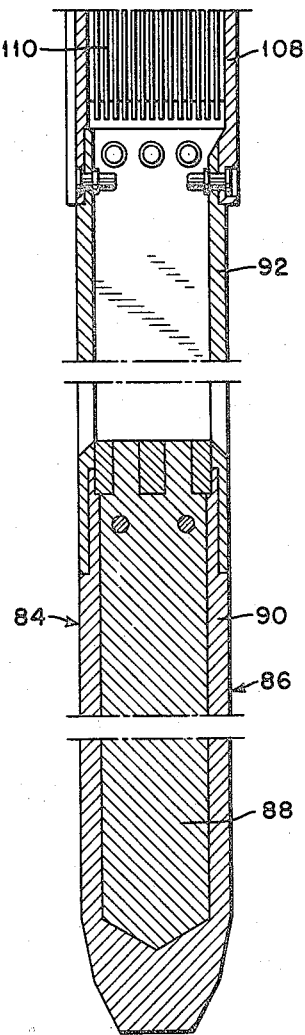
Figure 14 is a vertical central sectional view of the remaining portion of the control element shown in Figure 13.

The control element 84 of the type which has a portion containing fissionable material is shown in Figures 13 and 14, and is identical with the control elements 82 containing moderator material, except for the region between the sleeves 92 and 100, and similar numerical designations have been used on the drawings for the identical elements of the two types of control elements 74. The region between the sleeves 92 and 100 of the fuel containing control elements 84 comprises an outer jacket 108 surrounding a plurality of fuel plates 110 identical in design and construction to the inner fuel plates 50 of the fuel assemblies 34.

In the particular reactor construction used throughout as an example, the control elements 74 have an overall length of about 158⅜ inches. The bottom tip 86 is about 16½ inches long and its plug 88 is formed of lead and its jacket 90 is formed of stainless steel. The moderating element 96 of control element 82 is formed of beryllium and it begins at a point some 46 inches from the bottom and extends for a distance of 27⅝ inches. The central coolant hole 98 is 3/16 inch in diameter. The fuel plates 110 of control elements 84 are identical with the previously described inner fuel plates 50 of fuel assemblies 34 and have a spacing between adjacent surfaces of 0.118 inch. There are fourteen of these fuel plates 110. Thus, each control element 84 contains approximately 108 grams of $U^{235}$. The absorbing liners 106 in both types of control elements 82 and 84 are square in cross section, about 2.25 inches to a side, and are formed of cadmium clad with aluminum. These liners are 30¾ inches long. The thickness of the cadmium layer, itself, is about 0.020 inch. Sleeves 92 and 100 and jacket 108 are formed of aluminum. In external cross section both types of control elements 82 and 84 have a central section, indicated at 161, about 54⅞ inches long which has an outer shape and dimensions corresponding to the main central sections of fuel assemblies 34 and reflector assemblies 150, that is, straight on two sides and bowed on the other two sides (see Figure 6). Above and below this central section, the control elements have square outer cross sections so as to be able to snugly fit and slide within the upper and lower bearings 76.

For fine control of the reactor, four circular holes are left in the first reflector 22 adjacent the central channel 20 for accommodation of four regulating rods 75, as indicated in Figures 6 and 7, these four rods 75 containing a slow neutron absorber. The details of the regulating rods 75 for the exemplified reactor are shown in Figures 16 and 17. The rods are 1½ inches in diameter and are hollow substantially throughout their length. Their overall length is about 83⅝ inches. They consist of a lower aluminum section 162, a middle absorber section 163, an upper aluminum section 164, and a ball coupling joint 165 at the top. It will be understood that by means of the joint 165, the rod is releasably attached to a vertical lifting shaft (not shown) which extends through a bearing in the spider 160 and through the top plug 122 and is adjustably positioned in the vertical direction by a motor located on top of plug 122, similarly to the vertical lifting shafts 158 associated with control elements 74. The rods 75 are guided by the accommodating holes in the first reflector 22 and by bearings (not shown) provided in the upper and lower support members 42 and 40, respectively. When detached from its vertical lifting shaft, the regulating rod 75 is supported by its collar 77 resting upon the top of the bearing in the upper support member 42, in which position its absorber section 163 is centered vertically with respect to the horizontal mid-plane of the reactor active portion 10. The absorber section 163 consists of four 21¼ inches long inner strips 166 of cadmium encased within aluminum tubing 167. Each of the four cadmium strips 166 is 0.020 inch thick and forms 60° of the arc of a 1.35 inch diameter circle, the strips being equally spaced from one another by 30° of arc. No internal cooling of the regulating rods 75 is required. While provision is made for four of these regulating rods 75, normally only one will be used for control with one more as standby. The remaining two holes in the first reflector 22 can be filled with beryllium rods or can be used for irradiation of samples.

The unusual flexibility of possible arrangements within the central channel 20 afforded by the present design may be seen by reference to Figure 15. The entire central channel 20 may be considered as composed of 45 sub-sections arranged in rows A through E (from top to bottom in Figure 15), each row having subsections $a$ through $i$ (from left to right in Figure 15). Insofar as the reactor structure itself is concerned, each of the subsections excepting subsections $b$, $d$, $f$ and $h$ of rows B and D, may be occupied either by a fuel assembly 34, or by a reflector assembly 150, or by neither, in which latter case the subsection is occupied by water which is also an efficient moderator. Each of subsections $b$, $d$, $f$ and $h$ of row B may be occupied by either the moderator portion or the absorber portion of the associated control element 82, and each of subsections $b$, $d$, $f$, and $h$ of row D may be occupied by either the fuel portion or the absorber portion of the associated control element 84. Of course, there is imposed on the permissible arrangements of fuel assemblies 34 and reflector assemblies 150 the requirement that the number and arrangement of fuel assemblies be sufficient to constitute a critical active portion.

Although not shown in the schematic diagram of Figure 15, it will be understood that the various adjacent fuel assemblies 34, reflector assemblies 150, and control elements 82 and 84 in the central channel 20 are spaced somewhat from one another and from the channel sides to avoid possible interference and to permit the flow of coolant water therebetween, this spacing amounting to about 0.118 inch in the left-to-right direction of Figure 15, and about 0.039 inch in the up and down direction of Figure 15.

The particular loading pattern of fuel assemblies 34 and reflector assemblies 150 which is employed in the reactor used as a specific example throughout this application is as indicated in Figure 15. As there shown, all subsections of row A and subsections $a$, $c$, $e$, $g$ and $i$ of row B are occupied by reflector assemblies 150, and all subsections of row D, as well as subsections $a$, $c$, $e$, $g$ and $i$ or rows C and E are occupied by fuel assemblies 34. When the reflecting control elements 82 and the fuel containing control elements 84 are all the way down, that is, when they are resting in shock absorbers 80, their neutron absorbing liners 106 occupy subsections $b$, $d$, $f$, and $g$ of rows B and D, and these liners extend throughout the entire vertical dimensions of the active portion 10, that is, the liners are centered vertically with respect to the fuel plates 50 of fuel elements 34. Such a situation would represent the lowest reactivity position of the control elements 74. Under such conditions, the exemplified reactor would be sub-critical and could not support a self-sustaining chain reaction of neutron induced fission. Gradual withdrawal of any one of the control elements 74 would gradually increase the reactivity of the reactor, and the maximum reactivity position of the control elements 74 would be represented by their all being totally withdrawn, that is, by the moderator portion of the control elements 82 and the fuel portion of control elements 84 being all centered vertically with respect to the active portion 10. With the control elements in such position, the fuel plates 110 of control elements 84 and the beryllium element 96 of control elements 82 would extend throughout and adjacent, respectively, the entire vertical dimension of the action portion 10. It will thus be apparent that there is provided a large operating range of reactivity between minimum and maximum which may be controlled by appropriate positioning of control elements 82 and 84. At any given time in actual operation, of course, the control elements 82 and 84 will be positioned so that the effective multiplication factor ($k_{eff}$), sometimes referred to as the reproduction factor ($r$), for the reactor as a whole will be sufficiently close to unity that it may be brought exactly to unity by appropriate movement of the regulating rod 75. The actual position of the control elements which will effect this condition will vary, depending upon the extent of depletion of the uranium 235 in the fuel assemblies 34, the amount of fission products which have accumulated, particularly $Xe^{135}$ and $Sm^{149}$, the number and character of the irradiations being carried on, the operating temperature, and so forth. It is to compensate for these variables that the large control range of reactivity is provided in the present reactor.

In the initial loading of the reactor, top plug 122 together with the spider 160 suspended therefrom are removed, as also is the unit consisting of the upper guide grid 44, grid spacer 46, and upper assembly grid 36. All control elements 74 and regulating rods 75 are then placed in their lowermost (minimum reactivity) position, as a precaution to insure against the reactor becoming critical prematurely. The absence of the water moderator from tank 24 in this initial loading step, however, also insures against the reactor becoming critical. The fuel assemblies 34 and reflector assemblies 150 are then inserted with their lower rectangular connectors 69 snugly fitting into the rectangular orifices 70 of the lower assembly grid 38. The upper grid unit is then lowered into place in the upper grid support member 42 and locked in position by locking mechanism 168, care being taken during the lowering of this unit that the protruding upper ends of the fuel assemblies, reflector assemblies, and control elements are aligned with their various associated accommodating apertures and bearings in the upper grid unit. The top plug 122 and spider 160 are then replaced, and the connections are effected between the tops of control elements 74 and regulating rods 75 and their respective associated vertical lifting shafts 158. After the water and air coolant systems are placed in operation, the reactor may be brought to a critical condition and its power raised to the design level by gradual withdrawal of one or more of the control elements 74. Short term variations of the power level near its operating level may thereafter be controlled by means of regulating rods 75.

After initial operation, fuel assemblies, reflector assemblies, control elements, and regulating rods may be removed from the top of tank 24, with water in the tank, by a reversal of the above-described process, provided these parts are not too radioactive. However, after the reactor has been operating at design power level for some time, the fuel assemblies and the control elements, particularly those control elements of type 84 having a fuel portion, will be too radioactive to be unloaded from the top of the reactor. For unloading these highly radioactive fuel assemblies and control elements, a discharge chute 172 (Figure 4) is provided, the chute being aligned with a removable beryllium plug 174 passing vertically through, and forming a part of, the first reflector 22. Chute 172 passes through bottom plug 78, and leads to a canal 173 (see Figure 1), via a valve and seal (not shown) which acts as a lock to prevent excessive loss of water during unloading. In order to unload a fuel assembly, for example, the top plug 122, the spider 160 suspended therefrom, and the unit consisting of upper guide grid 44, grid spacer 46 and upper assembly grid 36, are removed upwardly from the tank 24. The beryllium plug 174 is then temporarily withdrawn upwardly, and the fuel assembly is lifted out of the central channel 20, moved laterally, and then dropped through the vertical passageway left by plug 174 in the first reflector 22. It will be understood that elongated hand tools (not shown) in the nature of grappling devices may be employed to reach down into the tank 24 from above to grasp and manipulate the fuel assemblies, control elements, and removable beryllium plug. It then passes via chute 172 into the canal 173 along which it can be conveniently removed from the immediate vicinity of the reactor while always being maintained under about 15 feet of water.

The reactor used throughout as a specific example is designed to operate at a power level of 30,000 kw. of heat and an average slow neutron flux level in the active portion of about $2 \times 10^{14}$ neutrons/cm.$^2$/sec. The 30,000 kw. of heat is distributed approximately as follows: 28,250 kw. in the active portion, 1,200 kw. in the preliminary and first reflector, 500 kw. in the graphite second reflector, and 50 kw. in the thermal shield 28. This heat is removed by a primary water coolant system and a secondary air coolant system, as previously indicated. The water coolant system uses recirculating demineralized water which flows through the tank 24 at a rate of 20,000 gallons/min. entering at 100° F. and leaving at 111° F. The water velocity through the spaces between the fuel plates of the fuel assemblies 34 is about 30 ft./sec. The fuel plates represent a total active surface area of about 400 square feet. A pressure drop of about 40 p. s. i. is experienced by the water in flowing through the reactor. Under such conditions, the average heat flux in the active portion is about 300,000 B. t. u./square ft./hr. and the maximum heat flux at any point in the active portion is about 500,000 B. t. u./square ft./hr. With such a water coolant system, the maximum temperature of any metal surface within the tank 24 will not exceed 212° F. that is, the boiling temperature of the water coolant.

The secondary air coolant system consists of a flow of about 2000 lbs./min. at a pressure drop of about 55 inches of water, about 1610 lbs./min. flowing in the path including the side thermal shield 28 and second reflector 26, about 250 lbs./min. flowing in the path including the top thermal shield 28, and about 140 lbs./min. being allowed for leakage through and along the various irradiation passages 32. The air enters at about 80° F. and leaves at about 190° F. Such an air coolant system will serve to maintain the temperature of all parts located outside tank 24 at a safe value with an adequate margin of safety.

It should be stated that the heat evolved in the reactor cannot be reduced to zero instantaneously simply by inserting all control elements and thus shutting down the reactor. This is due to the continued heat generation resulting from absorption of the gamma and beta radiation from the radioactive fission products. Thus, immediately after shut down, the active portion will still generate about 2000 kw. and the beryllium reflector about 400 kw. and these values will thereafter fall off proportionally to $t^{-0.2}$, wherein $t$ is time in seconds. Thus, the water coolant must continue to be circulated at a minimum of about one-third normal rate immediately after shut down, and at a minimum of about one-fortieth normal rate 10 hours after shut down. Similarly, the air coolant system should be kept in operation for some time after shut down.

Some of the nuclear physics aspects of the reactor will now be dealt with. In the interests of definiteness, it will be considered for the moment that the four control elements 84 in row D of Figure 15 are fully withdrawn so that their fuel portions are centered with respect to the active portion, and that the active portion is in a cold clean state, that is, it is operating at zero power with unused fuel assemblies 34 and control elements 84. (Undepleted fuel and no accumulated fission products.) The active portion comopsition then may be defined generally as one consisting in its entirety of water, aluminum, $U^{235}$ and $U^{238}$; having a $U^{235}$ concentration of 38 gms./liter; having a volumetric ratio of aluminum to water of 0.71; and having an atomic ratio of $U^{235}$ to $U^{238}$ of 14.3. Such a reactive composition has a multiplication constant (k) of about 1.61; a Fermi age ($\gamma$) of about 62 cm.$^2$; a diffusion area ($L^2$) of about 3.4 cm.$^2$; and a thermal utilization factor ($f$) of about 0.75. When surrounded by a beryllium reflector, as in the present case, such a reactor composition would become critical at dimensions substantially less than the actual dimensions of the active portion of the present reactor. Thus, the herein exemplified reactor has a large amount of excess reactivity built into it, and this excess reactivity is initially "held" or cancelled out by means of control elements 74.

This excess reactivity is required in order to compensate for four poisoning effects involved in the actual continued operation of the reactor. The first of these is depletion of the $U^{235}$ during operation, which, at the design power level, takes place at a rate of about 1% per day. Since it is desired to operate on a 15 day fuel assembly recharging cycle, a total of 15% depletion will occur in the fuel assemblies before they are replaced.

A second poisoning effect arises from the build-up of various fission products which parasitically absorb neutrons. During operation of the reactor, the concentration of the various fission products tends to attain an equilibrium value at which their rate of formation, directly from fission or from radioactive decay of parent fission products, is exactly equal to their rate of disappearance as a result of radioactive decay and nuclear transformation. Furthermore, two of the most troublesome fission products $Xe^{135}$ and $Sm^{149}$ are daughter products of the short half-life fission products $I^{135}$ and $Il^{49}$, respectively. The concentration of these fission products $Xe^{135}$ and $Sm^{149}$, therefore, continues to build up after the reactor is shut down, attaining a maximum about 10 hours after shut down and thereafter decreasing. Since it would require an undue amount of excess reactivity to be built into the reactor in order to compensate for the maximum possible loss in reactivity from $Xe^{135}$ and $Sm^{149}$ at any time after shut down (about 43%

$$\frac{\Delta k}{k}$$

10 hours after shut down), a compromise has been effected in the present reactor whereby sufficient excess reactivity (about 9.6%) is provided to override the $Xe^{135}$ and $Sm^{149}$ effect either within one-half hour after shutdown or more than 48 hours after shutdown. This, of course, imposes a premium upon the ability of the operator to start-up the reactor within a grace period of one-half hour after shutdown.

A third poisoning effect involved in reactor operation is due to the temperature differential between zero and full power, and between winter and summer, conditions. The present reactor has a negative temperature coefficient of reactivity. The maximum loss in reactivity of the present reactor resulting from the increase in temperature over the expected operating range amounts to about 0.8%

$$\frac{\Delta k}{k}$$

Finally, a fourth reactivity loss of about 5%

$$\frac{\Delta k}{k}$$

will be involved in the introduction of samples into the various irradiation channels of the reactor.

The various reactivity losses mentioned above may be summarized as follows:

| Source of reactivity loss: | Percent $\frac{\Delta k}{k}$ |
|---|---|
| $Xe^{135} + Sm^{149}$ | 9.6 |
| Depletion and low cross section fission products | 3.5 |
| Temperature | 0.8 |
| Sample irradiations | 5.0 |
| Total | 18.9 |

In order to be able to override the above-indicated reactivity losses, the present reactor has built into it an excess reactivity of about 19%

$$\frac{\Delta k}{k}$$

The eight control elements 74 are capable of controlling a total of about 40%

$$\frac{\Delta k}{k}$$

and each regulating rod 75 is capable of controlling about 0.5%

$$\frac{\Delta k}{k}$$

With all control elements and regulating rods in their "in," or minimum reactivity, positions, the effective multiplication factor $k_{eff}$ of the reactor in its cold, clean state is about 0.8.

At power levels below about $10^{-11}$ of design power, that is, at slow neutron flux levels below about 2000 neutrons/cm.$^2$/sec., no accurate and reliable means for measuring and indicating the slow neutron flux is provided. This, therefore, is a "blind" region in which the operator would not be permitted to withdraw any of the control elements 74 at all, lest the reactor become supercritical on a very short period without his knowledge. The slow neutron flux of the reactor must therefore be raised above this blind region by means of some extraneous source of neutrons. In prior reactors, provision has been made for the removable insertion into the reactor of a conventional radium-beryllium or polonium-beryllium source for this purpose.

In the present case, and in accordance with the principles of the present invention, advantage is taken of the photo-neutron sensitive properties of the beryllium already present in the reactor to provide a permanently incorporated and automatically reactivated neutron source. For this purpose, a quantity of $Sb^{123}$ is permanently incorporated in the reactor in the vicinity of the reactor beryllium. During operation of the reactor, some of the $Sb^{123}$ atoms undergo a nuclear transformation by slow neutron absorption and become radioactive, the nuclear reaction being as follows:

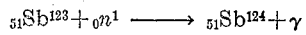

The resulting $Sb^{124}$ is radioactive, emitting a 1.72 M. E. V. gamma ray with a 60 day half-life. Since beryllium is photo-neutron sensitive to gamma photons of this energy, neutrons are produced by interaction of the gamma rays and the beryllium, according to the following nuclear reaction:

The threshhold energy of the incident gamma photon for the immediately above reaction is about 1.64 M. E. V., which is below the 1.72 M. E. V. energy of the gamma ray given off by the $Sb^{124}$ atoms. Thus, by the simple permanent incorporation of a quantity of $Sb^{123}$ in the vicinity of the beryllium, a cheap, convenient, permanent, and automatically reactivating neutron source is provided of sufficient strength to maintain the slow neutron flux level at a sufficiently high level to be reliably measured for the duration of periods of shut down. In order to provide for the very first start-up of the reactor, the antimony which is to be permanently incorporated in the reactor may be made initially radioactive by subjecting it to neutron irradiation in another reactor. Alternatively, a conventional radium-beryllium or polonium-berryllium neutron source may be used for the very first start-up.

In the specifically exemplified reactor, the antimony is in the form of a solid cylindrical vertical rod one-half inch in diameter and six inches long. It is formed entirely of normal or natural occurring antimony, the $Sb^{121}$ isotopic component thereof being innocuous. It is positioned in the first reflector 22 at a point in the horizontal plane which is schematically indicated by reference numeral 15 in Figure 7, there being a vertical hole in the first reflector to accommodate it. In the vertical direction it is centered with respect to the horizontal midplane of the active portion 10. This amount of antimony will last indefinitely, and after a short period of full power operation of the reactor, will have become sufficiently radioactive to maintain the slow neutron flux level of the reactor above 2000 neutrons/cm.$^2$/sec. for many days after the reactor is shut down.

It should be stressed that the actual position of the antimony in the reactor is not at all critical, but for maximum effectiveness, of course, it should be located reasonably near both the reactor beryllium and the reactor active portion. It will also be apparent that the neutron source of the present invention would have equal application in association with a reactor wherein beryllium is disposed directly in the active portion to function as the reactor moderator.

It will be understood that in order to provide the operator with information required in the control of the reactor, various types of conventional instruments are provided to measure such operating data as neutron flux, reactor period, temperature, pressure, coolant activity, etc. at various points in the reactor. Automatic safety circuits, responsive to various of these measurements, are also preferably provided, these circuits being adapted to cut off the electromagnet holding currents and thus release the control elements 74 and shut down the reactor in the event that any of these measurements should indicate an unsafe operation condition. While the present reactor can, with some degree of difficulty and inefficiency, be operated entirely under the control of the operator, assisted, if desired, by various types of automatic control devices and circuits of the prior art, in the interests of efficiency, it is preferable to employ the combination manual and automatic control system especially developed for the exemplified reactor, which system is described and claimed in the co-pending U. S. patent application Serial No. 357,216 of common assignee, entitled Overall Control System for High Flux Pile, filed on May 25, 1953, in the names of Henry W. Newson, Eugene P. Wigner, Elbert P. Epler, and Thomas E. Cole.

As stated above, the present reactor has the unusual property of having a higher maximum slow neutron flux in the reflector than in the active portion, or core, of the reactor. In order to have an accumulation of slow neutrons in the reflector of a reactor which exceeds that in the core of the reactor, certain limitations must be placed upon the construction of the reactor. In the first place, it is clear that the absorption of slow neutrons in the reflector of the reactor must be relatively small, and also that the absorption of slow neutrons in the core of the reactor must be relatively high. Hence, not all neutron reflecting, or moderating, materials may be used in the reflector of the reactor, nor can all types of reactive compositions be utilized in the core. It has been found that the maximum slow neutron flux in the reflector of the reactor will exceed the maximum slow neutron flux in the core when the ratio of the thermal neutron scattering cross section to thermal neutron absorption cross section, averaged overall of the materials in the reflector, is approximately twice the ratio of the thermal neutron scattering cross section to thermal neutron absorption cross section, averaged over all of the materials in the core of the reactor, and that this ratio is preferably in the neighborhood of 10 for such a reactor. For a reactor having the particular reactive core composition employed in the exemplified design, a reflector formed essentially of either beryllium or heavy water will satisfy this requirement.

It is also necessary that the reflector region which conforms to the above requirement be of sufficient thickness and be located immediately adjacent the core. It has been found that a reflector of about 12 inches thickness is adequate when formed essentially of beryllium. It will be noted that in the present design these requirements are met in all lateral directions but not in the vertical direction, since more than 12 inches of beryllium immediately surrounds the core on all sides, whereas ordinary water is employed as the reflector immediately above and below the reactor. It should be pointed out that it is necessary to meet the above indicated requirements only with respect to the side or sides of the core in which it is desired to achieve a higher slow neutron flux in the reflector than in the core.

In order to have an accumulation of slow neutrons in the reflector, it is also necessary that the core of the reactor have one overall dimension which is not more than one-half of the other overall dimensions of the core, and preferably not more than one-fifth of the other dimensions. In the particular reactor described to illustrate the present invention, the overall dimensions of the core of the reactor are approximately 9½ inches wide by 28 inches long by 23¾ inches high, thus clearly meeting this requirement. It is also to be noted that the core of this reactor is in the form of a thin slab, which is believed to be the optimum geometry for a reactor achieving these desired results.

It is possible to determine whether a particular neutronic reactor will exhibit the property of having a higher maximum slow neutron flux in the reflector than in the core by means of the equation:

$$N = \frac{M_{ref}^2}{M_c^2} \times k$$

where N is a number which will be referred to as the "neutron distribution factor" of the reactor, $k$ is the multiplication constant of the reactive composition employed as the core of the reactor, $M^2_{ref}$ is the migration area for neutrons in the reflector of the reactor, and $M^2_c$ is the migration area for neutrons in the core of the reactor. It has been found that for values of N in excess of 9, the maximum slow neutron flux in the reflector of the reactor will exceed the maximum slow neutron flux in the core of the reactor.

It is evident from the foregoing discussion, that the construction of a neutronic reactor having a maximum slow neutron flux in its reflector greater than the maximum slow neutron flux in its core involves the use of a reactive core composition having a high multiplication constant ($k$). It has been found, that neutronic reactors, wherein the multiplication constant ($k$) of the core composition is less than 1.3, cannot be made to attain criticality with the relative core dimensions required for it to exhibit a higher maximum slow neutron flux in the reflector of the reactor than in the core thereof.

The particular reactor design employed as a specific example throughout the present application meets all of the above requirements, with the result that the maximum slow neutron flux in the beryllium reflector exceeds the maximum slow neutron flux in the core. This is indicated in Figure 18 wherein the profiles of various slow neutron flux levels in the horizontal mid-plane of the exemplified reactor, operating at its design power level, are shown. In this figure the numbers within the boxes designate the slow neutron flux of the associated profile in units of $10^{14}$ neutrons/cm.$^2$/sec. As indicated in Figure 18, the maximum slow neutron flux occurs in the beryllium reflector several inches from the center of each long side of the core and has a value of about $5 \times 10^{14}$ neutrons/cm.$^2$/sec. The maximum slow neutron flux in the core 10 occurs at its center and has a value of about $2.5 \times 10^{14}$ neutrons/cm.$^2$/sec., the average slow neutron flux in the core being about $2 \times 10^{14}$ neutrons/cm.$^2$/sec. In the vertical direction, where ordinary water is the reflector immediately adjacent the core, the conditions required to achieve this effect are not met, and the slow neutron flux distribution taken along the vertical center line of the core exhibits its absolute maximum at the center of the core. The fast neutron flux has its maximum value of about $4.0 \times 10^{14}$ neutrons/cm.$^2$/sec. at the center of the core and continuously falls off in all directions outwardly from the center.

It will be evident from the symmetry of the flux profiles about the core 10, as illustrated in Figure 18, that the neutrons recognize no distinction between what has herein been referred to as the preliminary reflector 12 on one side of the core 10 and that portion of what has herein been referred to as the first reflector 22 which lies on the opposite side of the core. They both serve as neutron reflectors for the core and both have substantially the same nuclear characteristics. In the description of the actual construction of this reactor, however, it has been found convenient to distinguish between them as to nomenclature since their components differ structurally. It should not be implied from this difference in nomenclature that the two reflectors serve different nuclear purposes or have different nuclear effects.

Another example of a reactor meeting the conditions required to exhibit a higher maximum slow neutron flux in the reflector than in the core comprises a rectangular core 51 cm. x 11 cm. x 66 cm., consisting in its entirety of a substantially homogeneous mixture of $U^{235}$, $U^{238}$, aluminum, and water; containing 1.35 kg. of $U^{235}$; having a volumetric ratio of aluminum to water of 0.65; and having an atomic ratio of $U^{235}$ to $U^{238}$ of 14.3; the core being immediately surrounded with a 30 cm. beryllium reflector.

The fuel assemblies 34 constitute perhaps the most difficult and most critical element in the design and operation of the present reactor. It will be apparent that the fuel plates 50 are subject to intense irradiation by fast neutrons, fission fragments, and other radiation, all of which has a deteriorative effect on the internal structure and physical characteristics of the plates. These plates are also subject to the thermal stresses induced by the temperature variations over their operating temperature range and to the strains and pressures resulting from the high rate of flow of coolant water. At the same time, it is desired that their lifetime be such that as much as 15% of their total $U^{235}$ content undergo fission before they are replaced. All of these factors necessarily tend to produce dimensional changes, distortion and warping of the plates. On the other hand, it is most important that the spacing between plates be maintained essentially uniform over the entire large surface area of the plates in order that the efficiency of heat removal not be impaired and local and tolerable temperature rises result. Complicating the problem still more is the fact that the usual mechanical aids in the maintenance of uniformity of spacing, such as the comb-shaped supports 62 and the grooves in side plates 52, can only be applied at the plate edges, that is, where there exists no inner layer of fissionable material requiring cooling.

This seemingly almost hopeless problem was solved by giving all of the plates an identical initial curvature in one direction, as shown in Figure 9. This assures that any additional buckling of the plates during operation will act equally, and in the same direction, for all plates, that is, in a direction such as to augment the initial curvature. With the present design therefore, it is impossible for adjacent plates to buckle in opposite directions and thus approach or actually contact each other. Another advantage derived from the initial curvature of the plates is a geometrical one which derives from the fact that any given amount of thermal expansion of a curved plate having its ends fixed results in less actual lateral displacement at the center of the plate than would be the case if the plates were flat. It has been found that the use of curved parallel fuel plates, as described, avoids any serious adverse effects resulting from the distortion and warping inherent under the stringent operating conditions involved in the present design.

In the construction of the present reactor it is, of course, desirable that the various non-fissionable materials employed in and near the core have as high a density as possible and contain as few impurities as possible, particularly impurities such as boron, having high thermal neutron absorption cross sections. However, since the present reactor employs uranium highly enriched in the fissionable 235 isotope, and has considerable excess reactivity built into it, the density and purity of materials is not crucial, as it is in natural uranium reactors, the only adverse effect of low density materials including impurities being to reduce somewhat the excess reactivity of the reactor and thus to decrease its operating flexibility. The better grades of commercially available non-fissionable materials are entirely satisfactory for use in the construction of the exemplified reactor.

While various of the figures of the drawings are drawn to different scales, individual figures are drawn in their entirety to a uniform scale. Accordingly, any dimensions of the specifically exemplified reactor not specified in the written description can be obtained from the drawings by comparison with a specified dimension of a part which is shown on the same figure.

Since many changes could be made in the above construction and many apparently widely different embodiments of this invention could be made without departing from the principles thereof, it is intended that all matter contained in the above description, or shown in the accompanying drawings, shall be interpreted as illustrative and not in a limiting sense.

What is claimed is:

In combination with a neutronic reactor of the type employing beryllium in a reflector region around the active portion, a self-reactivating neutron source comprising a quantity of antimony including both antimony —123 and antimony —124 fixedly positioned in said reflector region, for conversion of said antimony —123 to antimony —124 upon bombardment by neutrons from said reactor, said antimony —124 emitting gamma rays of sufficient energy to produce neutrons from said beryllium reflector.

References Cited in the file of this patent

UNITED STATES PATENTS

| 2,708,656 | Fermi et al. | May 17, 1955 |
| 2,796,398 | Creutz et al. | June 18, 1957 |
| 2,812,303 | Daniels | Nov. 5, 1957 |

OTHER REFERENCES

The Physical Review vol. 73 Mar. 15, 1948 pp. 545–549; vol. 71 Apr. 15, 1947 pp. 497–510; vol. 75 1949 pp. 1794–1799. (An article by A. O. Hanson).

Introductory Nuclear Physics by David Halliday, John Wiley & Sons, New York, 1950, pp. 217–219.

The Elements of Nuclear Reactor Theory by Samuel Glasstone and Milton C. Edlund, D. Van Nostrand Co., New York 1952, pages 34, 89.

U. S. Atomic Energy Comm. A. E. C. D. 3065, Apr. 12, 1952, declassified Aug. 13, 1952, pp. 4–26.